Figures 1, 3:
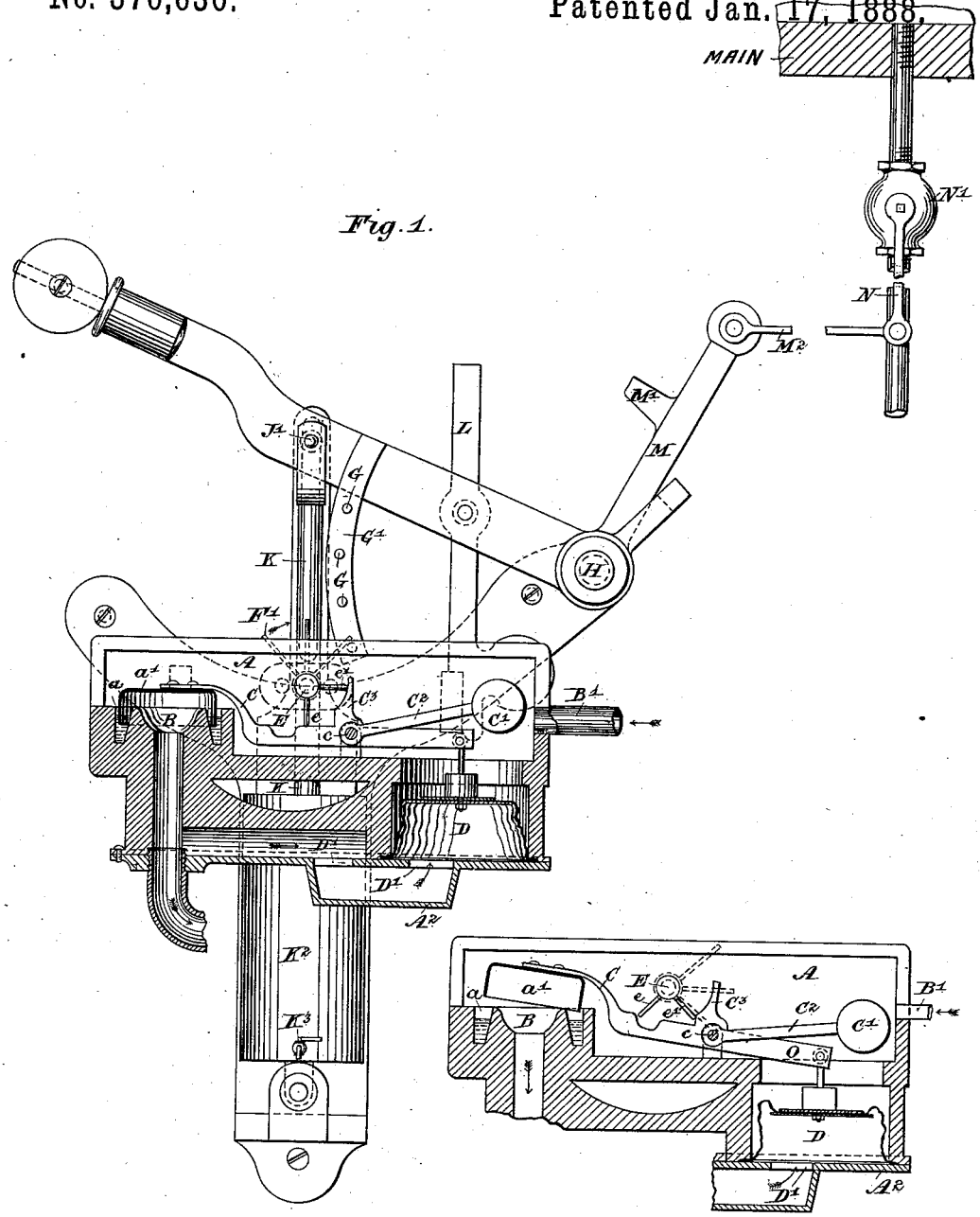

(No Model.) 2 Sheets—Sheet 1.

H. W. & A. F. COLE.
GAS AND OTHER FLUID PRESSURE CONTROLLING APPARATUS.

No. 376,636. Patented Jan. 17, 1888.

Witnesses
Harry S. Rohrer
Parker H. Sweet Jr.

Inventors,
Henry William Cole
Albert Frederick Cole
By Harding & Tichenor
Their ATTORNEYS (No Model.) 2 Sheets—Sheet 2.
H. W. & A. F. COLE.
GAS AND OTHER FLUID PRESSURE CONTROLLING APPARATUS.
No. 376,636. Patented Jan. 17, 1888.
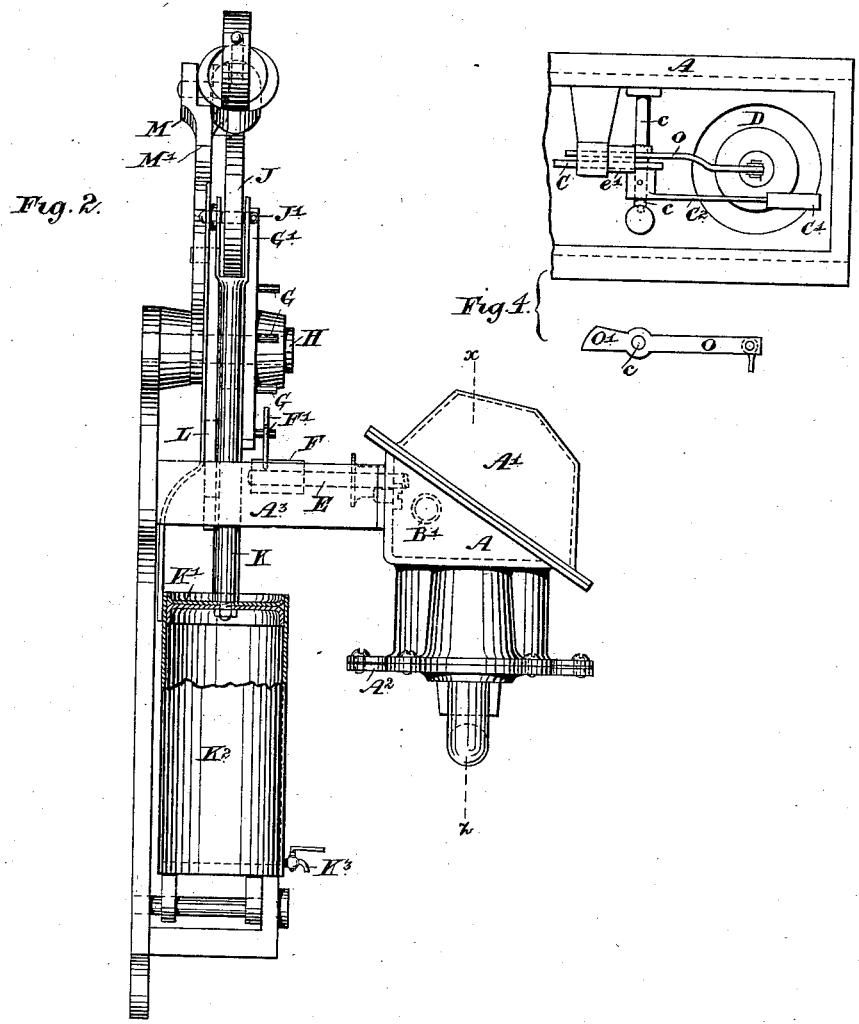

UNITED STATES PATENT OFFICE.

HENRY WILLIAM COLE AND ALBERT FREDERICK COLE, OF STOURPORT, COUNTY OF WORCESTER, ENGLAND.

GAS AND OTHER FLUID PRESSURE CONTROLLING APPARATUS.

SPECIFICATION forming part of Letters Patent No. 376,636, dated January 17, 1888.

Application filed March 29, 1887. Serial No. 232,851. (No model.) Patented in England November 25, 1886, No. 15,404.

*To all whom it may concern:*

Be it known that we, HENRY WILLIAM COLE and ALBERT FREDERICK COLE, subjects of the Queen of Great Britain, residing at Stourport, in the county of Worcester, England, manufacturers, have invented certain new and useful Improvements in or relating to Gas and other Fluid Pressure Controlling Apparatus, of which the following is a specification.

The object of this invention is to prevent the passage of gas or other fluid in case of leakage or escape, and one apparatus may be applied to the main or a separate apparatus may be used for each tap chandelier or other place where a leakage or escape may be anticipated.

The instrument consists of a chamber with inlet and outlet openings for the gas, and within this chamber is pivoted a lever, which carries at one end a valve or equivalent which controls the outlet, and at the other end has a balancing device subject to the pressure of the gas on both sides. The valve may preferably be in form of a cup dipping into a mercury seal, and the balancing device is preferably a flexible diaphragm loaded as required and connected with the lever aforesaid. A piston working in an open-ended cylinder or a second mercury-cup would give the same result; but a leather diaphragm is found to give satisfaction. Upon the lever is a projection having inclined faces adapted to be moved or controlled by two arms extending from an axis crossing the direction of the lever. The projection forms, with the pivoted lever, a bell-crank lever, and the axis carrying the arms revolves so that the arms traverse the angle between the projection and the lever.

The action of this part of the apparatus is as follows: The chamber above the valve and diaphragm is put under pressure as soon as the tap on the main is opened; but the gas cannot pass, because one of the arms is pressing upon the lever and holding the cup down in the mercury seal. By means which will be presently explained the action of opening the tap in the main has set the spindle which carries the arms revolving, preferably with an intermittent motion, so that as the arm which held down the lever is withdrawn the second arm engages the first of the inclined faces of the bell-crank projection, and as it turns forces this back, thereby turning the lever and lifting the cup out of the mercury seal, so that the gas passes into the outlet. When the arm has reached the apex of the incline and the cup is out of the mercury, it stops in its course to give time for any leak to manifest itself or for the pressure to equalize on both sides of the apparatus. If this equalization takes place, there can be no leak; but the second arm, which moves on again, engages with the lever and forces the cup again into the mercury, where it holds it for a longer or shorter time, to which it is set according to the length of piping which has to be tested, and then continuing leaves the lever entirely free. If at this period there be no escape, the diaphragm end, being slightly the heavier, although the shorter, overpowers the cup end and tips it up, the lever allowing a clear way for the passage of the gas when it is wanted. If, however, there be a leakage, the cup, being on the longer end of the lever, is held in the mercury by the pressure of the gas and closes the passage, and so remains until the leak is stopped; or, if a tap has been left open by mistake until it has been closed, the tap is now again turned off at the main and the apparatus set going a second time, and, the equilibrium being restored, the valve remains open and the passage-way is clear. This apparatus is therefore of great utility where the gas is turned off every night, as if any tap has not been turned off it must be shut before any gas can be obtained for use.

Various means may be employed for giving motion to the spindle which carries the arms above mentioned; but the following is found to work well:

A weighted lever pivoted at one end is controlled in its descent by some regulating device—such as is commonly used for the levers of water-closets—an air or oil cylinder with a regulating tap or hole and piston being preferred. This lever is so connected with the tap on the gas-main that when the tap is closed the lever is raised and is held up by a detent, which is only released when the tap has been turned full on. Supposing this to have been done, the lever descends slowly, and carrying with it a section or quadrant which has pins or teeth, which engage in turn with arms or teeth upon the outer end of the spindle already mentioned. These are preferably arranged at intervals, so as to give the intermittent motion, which, as already explained, is preferred; but a toothed segment and toothed wheel could be used, or other equivalent means.

The cylinder which controls the descent of the lever we prefer to pivot at its closed end, so that it may oscillate, as required, and to keep it always in the proper line we connect it with a slotted arm, through the slot of which passes a pin fixed in the weighted lever. The result is that this arm and the piston-rod are always practically parallel, and the cylinder is always in its proper position.

This apparatus may be employed for other fluids besides gas—compressed air, for instance; but we have described it as applied to gas. Although we have described our apparatus as being coupled with the tap in the main, the latter may be dispensed with in some cases and the apparatus itself substituted therefor.

In the accompanying drawings, Figure 1 represents a front elevation, partly in section, as indicated by the line $x\ x$ in Fig. 2. Fig. 2 is a side elevation, and Figs. 3 and 4 are details of the chamber containing the controlling apparatus.

This chamber is formed in two parts, A and A', luted and screwed or otherwise fastened together so as to be perfectly gas-tight. In one part of the chamber is formed an annular groove, $a$, to contain mercury, and concentric with this groove is an opening, B, for the outlet of the gas. This opening may be closed by means of an inverted cup, $a'$, the rim of which dips into the mercury contained in the groove $a$. The cup $a'$ is attached to the longer arm of a lever, C, which is pivoted at $c$, the shorter arm of the said lever being attached to a collapsible diaphragm of leather or other flexible material, D. By means of passages D' communication is established between the outlet B and the under side of the diaphragm. For convenience of manufacture, the bottom $A^2$ of the chamber is separately constructed and attached by screws to the upper parts. By means of a counterbalance-weight, C', adjustable on the rod $C^2$, which may be either fixed to or form part of the lever C, the equilibrium of the said lever, when the latter is uninfluenced by other agency, is disturbed, the diaphragm end being slightly heavier than the other, and therefore tending to make the parts assume the position shown in Fig. 3.

Attached to or forming part of the lever C is a cam-faced projection, $C^3$, and projecting transversely across the lever C is a spindle, E, which passes through a gland or stuffing-box, E', formed on the part A of the chamber. From a boss on the spindle E and at right angles to each other project two arms, $e\ e'$, arranged to act on the lever C and projection $C^3$ to effect the opening and closing of the valve $a'$.

The remainder of the apparatus shown in the drawings hereto annexed is concerned in operating the spindle E; but as the regulator would act equally well if the spindle were turned by hand we will now describe the working thereof. The condition of the parts previous to commencing operations is that shown in Fig. 1, in which the valve $a'$ is immersed in the mercury in the groove $a$ and the diaphragm D distended, this position being maintained by means of the arm $e$ on the spindle E, which bears on the lever C. If gas be now turned on at the main, it will enter through the inlet-pipe B' into the chamber A, from which there is at present no outlet. The spindle E must now be turned slowly round in the direction of the arrow, and the first motion thereof will cause the arm $e$ to leave the lever C, and almost simultaneously the arm $e'$ will commence to act on the inclined face of the projection $C^3$, and, forcing the same back, will continue to raise the valve $a'$ from the mercury seal $a$ until a free passage for gas through the outlet B is provided. When the arm $e$ has reached the apex or summit of the incline on the projection $C^3$, the rotation of the spindle is suspended for a while until all the branch pipes on the outlet side have had time to become full of gas under the same pressure as that on the inlet side or main, or until the pressures on each side of the regulator are in equilibrium. The rotation of the spindle is then continued until the arm $e'$ comes into contact with the lever C and commences to close the valve $a'$, which it does completely when the pin has arrived at the vertical position underneath the spindle, acting precisely as the arm $e$ did previous to the commencement of the operation.

The rotation of the spindle E is at this stage again suspended and the valve allowed to remain closed for a short time, so that should any leak exist on the outlet side of the regulator, either through a flaw in the pipes or a tap being turned on, the gas on the outlet side may have time to escape and the pressure in the pipes become appreciably diminished. The spindle E is then turned until the arms $e$ and $e'$ are clear of the lever C and have left the same free to open the valve. As previously stated, the weight of the parts on each side of the fulcrum is so adjusted that the diaphragm end of the lever C is heaviest and will, when free to do so, overcome the weight on the valve side and raise the valve $a'$ from the mercury cup or trough $a$. It follows from this that if, when the spindle E has been turned round so as to remove the arms $e$ and $e'$ out of possible contact with the lever C, no opening for escape should exist, the pressure of gas on each side of the valve $a'$ and diaphragm D will be equal and will not affect the balance of the lever C, and therefore the preponderance of weight on the diaphragm side of the lever will assert itself, the diaphragm will sink, and the valve $a'$ will be raised, so as to afford a passage for the gas when necessary. Supposing, however, that a leak should exist, the gas during the time that the valve $a'$ has been closed will have escaped to such an extent that the pressure in the branch pipes will be considerably less than in the upper portion of the regulator. Under such circumstances the valve $a'$ will remain closed, as the pressure on the upper side thereof multiplied by the difference in length of the two arms of the lever C will more than counterbalance the excess in weight of the diaphragm end of the lever. The fact of the valve remaining closed may therefore be regarded as evidence of a leak existing, and until such has been stopped and the equilibrium between the main and the branch pipes restored by repeating the operation of opening the valve by means of the arms on the spindle E the valve will continue to close when released.

In the foregoing description the diaphragm has been described as attached to the end of the lever C and assisting to counterbalance the weight of the valve $a'$. Instead of this the diaphragm may be attached to the end of a separate lever, O, (see Fig. 4,) mounted loosely on the same pivot, $c$, the shorter end of the lever being provided with a cam or inclined tail-piece, $o'$, capable of being acted upon by the arms $e$ and $e'$, or others similarly placed. In this case the valve is counterbalanced entirely by the weight $C'$. As the spindle E revolves, the arms $e$ and $e'$, acting on the inclined tail-piece $o'$, will raise the diaphragm at the same time as they close the valve. The space underneath the diaphragm thus becomes filled with gas, and when the arms $e$ and $e'$ are removed from the spindle C and the cam $O'$ the diaphragm immediately falls and compresses the gas in the passages $D'$ and B. This displacement of gas from beneath the diaphragm compensates for the slight vacuum which would be produced by the raising of the valve $a'$ and helps to start the same in its opening motion.

As will be readily seen from the foregoing description, the motion of the spindle E is intermittent, the pauses varying according to the length of time requisite for filling the branch pipes and for allowing a leak to manifest itself by an appreciable diminution of pressure. In order to render this motion automatic, the following mechanism may be employed: Upon a boss, F, mounted on the spindle E outside the regulating-chamber A, are fixed a series of radial pins or pegs, $F'$. These pins gear with a second series of pins, G, fixed perpendicularly to an arm, $G'$, forming a segment of a circle, of which the stud H is the center. On this stud is mounted a lever, J, to which the arm $G'$ is fixed. To a stud, $J'$, on the lever J is pivoted a rod, K, carrying at its lower end a piston, $K'$, which fits into an air-cylinder, $K^2$, at the bottom of which is a small "pet-valve," $K^3$.

The function of the lever J is to impart rotation to the spindle E through the mediation of the pins F and G. When the apparatus is "set," the lever is elevated, as shown in Fig. 1, being retained in position by means of a catch-lever, L, which is pivoted to the lever J and rests on one of the branch arms $A^3$, which support the regulating-chamber. An arm, M, having a projection, $M'$, is pivoted on the stud H and connected, by means of a rod, $M^2$, with a crank, N, on the spindle of the valve $N'$ in the main or supply pipe. When the gas is turned on, the arm M is thrown forward, and the projection $M'$ strikes the upper end of the catch-lever L and disengages the same, thereby leaving the lever J free to drop. The rate at which the lever falls is governed by the air-cylinder $K^2$, while the periods of action and inaction on the spindle E are governed by the distance apart of the pins G on the segment $G'$.

The mechanism above described for imparting the requisite slow and intermittent motion to the spindle E is merely an illustration of the manner in which the invention may be carried into practical effect. It is obvious that this part of the apparatus admits of considerable modification, or automatic mechanism may be entirely dispensed with.

We claim—

1. The herein-described method of detecting leakage of gas or other fluid under pressure in the pipes conducting same, which consists in admitting such fluid to a suitable reservoir, opening communication between said reservoir and egress-pipes leading therefrom, cutting off the flow of said fluid to said egress-pipes, and, after an interval of time, utilizing the relation of pressure for automatically determining the presence or absence of leakage, for the purpose set forth.

2. The combination, with the gas-chamber having openings for the ingress and egress of the fluid, of a compensating-lever carrying a valve on one end and a weighted balancing device, such as described, upon the other extremity, a mercury cup or seal for said valve, and means for intermediately and gradually operating the said lever according to the amount of gas or fluid admitted to said chamber from the main or other source, as described.

3. The combination, with the fluid-chamber having openings for the ingress and egress of the fluid, of the lever carrying a valve and diaphragm operated by the varying pressure in the chamber and service-pipes, and a spindle carrying a suitable arm or arms for imparting the requisite intermittent motion to the said lever, substantially as specified.

4. The combination, with the fluid-chamber provided with ingress and egress openings, of the valve-lever located entirely within said chamber and having a valve and flexible diaphragm, and a balance-arm and movable weight for regulating the operation of the valve to compensate for the variable pressure of the fluid in the chamber and service-pipes, substantially as specified.

5. The combination, with a valve-lever having the cam projection at its fulcrum-point, of the spindle provided with radial arms which engage and operate upon said projection, and means for intermittently rotating said spindle, as specified.

In testimony whereof we have hereunto set our hands in the presence of two subscribing witnesses.

HENRY WILLIAM COLE.
ALBERT FREDERICK COLE.

Witnesses:
W. PHEYSEY,
GEO. GILBERT.